United States Patent
Cass

[19]

[11] Patent Number: 6,023,525

[45] Date of Patent: Feb. 8, 2000

[54] DETERMINING AN OPTIMAL COLOR SPACE DIRECTION FOR SELECTING COLOR MODULATIONS

[75] Inventor: Todd A. Cass, San Francisco, Calif.

[73] Assignee: Xerox Corporation, Stamford, Conn.

[21] Appl. No.: 08/956,326

[22] Filed: Oct. 23, 1997

[51] Int. Cl.[7] ...................................................... G06K 9/00
[52] U.S. Cl. ........................................................... 382/162
[58] Field of Search ..................... 382/162, 163, 382/166, 232; 358/515, 518; 235/469, 494; 380/9, 54; 283/72, 114

[56] References Cited

U.S. PATENT DOCUMENTS 5,664,072  9/1997  Ueda et al. .............................. 395/109

5,742,520  4/1998  Uchikawa et al. ....................... 364/526

*Primary Examiner*—Phuoc Tran

[57] ABSTRACT

This technique for determining an optimal color space direction for a respective input color mathematically models the determination of the color space direction as an optimization problem and uses models of human perception and scanner response that produce quantitative measurements of color changes. A given input color and a direction in color space away from the givien input color define a color change away from the input color. An objective function simultaneously minimizes the quantitative color difference of the color change measured by a human perception model and maximizes the color response difference of a scanner response model to find an optimal color space direction for the respective input color.

7 Claims, 4 Drawing Sheets

DETERMINING AN OPTIMAL COLOR SPACE DIRECTION FOR SELECTING COLOR MODULATIONS

BACKGROUND OF THE INVENTION

The present invention relates generally to a processor-based technique in the field of color image processing, and, more particularly, to a technique for determining an optimal color space modulation that satisfies a set of constraints; the color space modulation is given by a direction in color space away from a given input color. The color space direction is optimal when a measured color difference between the input color and a second color defined by the direction away from the input color simultaneously minimizes perception by a human viewer and maximizes detection by a digital image capture device.

Commonly-assigned pending U.S. patent application, Ser. No. 08/534,521, is hereby incorporated by reference herein for all that it teaches and is hereafter referred to as the '521 application. The '521 application, entitled "Binary Glyph Codes Based on Color Relationships," discloses a technique that may be used to encode information in a color image. The technique renders binary digital data on a display device, such as a sheet of paper, by printing a series of color patches on the sheet, with the 1 bits rendered as color patches of a first color and the 0 bits rendered as color patches of the second color. The color patches are arranged in a predetermined order along an axis on the surface. The second color relates to the first color by a fixed relationship in color space. In an illustrated embodiment, the first and second colors are a scalar $\alpha$ distance away from a color c along a vector $v_0$ in color space. The color patches can be intermixed with areas of a third color, the third color representing an average in color space of the first color and the second color. When the differences in the color patches of two different colors are imperceptible to a human, the information they represent becomes invisibly encoded in the image.

The '521 application discloses that one could also print each individual color patch in the form of a geometric data glyph, wherein the shape or linear orientation of each glyph determines whether it is assigned a 1 or 0 value, and where the different shading of each character represents a different color. Geometric data glyph technology is a category of embedded encoded information that is particularly advantageous for use in image applications that require the embedded data to be robust for decoding purposes yet inconspicuous, or even surreptitious, in the resulting image. Data glyph technology encodes digital information in the form of binary 1's and 0's which are then rendered in the form of very small linear marks. Generally, each small mark represents a digit of binary data; whether the particular digit is a digital 1 or 0 depends on the linear orientation of the particular mark. For example, in one embodiment, marks which are oriented from top left to bottom right may represent a 0, while marks oriented from bottom left to top right may represent a 1. In the case of black and white images, the individual marks are of such a size relative to the maximum resolution of a black and white printing device as to produce an overall visual effect to a casual observer of a uniformly gray halftone area when a large number of such marks are printed together in a black and white image on paper; when incorporated in an image border or graphic, this uniformly gray halftone area does not explicitly suggest that embedded data is present in the document. A viewer of the image could perhaps detect by very close scrutiny that the small dots forming the gray halftone area are a series of small marks which together bear binary information. The uniformly gray halftone area may already be an element of the image, or it may be added to the image in the form of a border, a logo, or some other image element suitable to the nature of the document. Several U.S. Patents cited in the the '521 application, which are all assigned to the assignee of the present invention, provide additional information about the uses, encoding and decoding techniques of data glyphs. For example, U.S. Pat. No. 5,315,098, entitled "Methods and Means for Embedding Machine Readable Digital Data in Halftone Images," discloses techniques for encoding digital data in the angular orientation of circularly asymmetric halftone dot patterns that are written into the halftone cells of digital halftone images.

The '521 application proposes that each individual color patch be printed in the form of a geometric data glyph wherein the shape or linear orientation of each glyph determines whether it is assigned a 1 or 0 value, and where different colors of each glyph determines whether the color is assigned a 1 or 0 value. Similarly, an individual data glyph mark is given one color and the field surrounding it is given a second color. The relative assignment of these colors determines either a 1 or 0 value. The relative colors of neighboring glyphs are independent of the orientations of neighboring glyphs, and so the geometry-based glyphs can be used to render one set of data, while the relative colors of neighboring glyphs, or glyphs and their backgrounds, render another set of digital data.

With regard to the illustrated embodiments in the '521 application, it is noted that, in the choice of orientation of the vector $v_0$ and the extent of the scalar $\alpha$ that are used to determine the two colors that are used to produce the color patches, it is desirable to balance the accuracy and sensitivity of the rendering or display device (e.g., a printer) and the digital image capture device (e.g., a scanner) being used with the sensitivity of the human eye. It is desirable to have the deviation between the two colors to be maximally detectable by a scanner and minimally detectable by the human eye. When an average color of the two colors is rendered on the page and is visible to the human eye, the average color should be deemed merely the carrier of information, and the color deviations of neighboring color patches being a modulation of the carrier.

The '521 application provides a heuristic approach to selection of the color space direction, $v_0$, and the scalar, $\alpha$, by noting that, in practical embodiments of the invention, it may be desirable to select the orientation of vector $v_0$ and/or the scalar $\alpha$ based on the absolute value of a desired average color, c, around which the modulations $\pm \alpha v_0$ occur. Different average colors may be reproduced or detected with different peculiarities or common errors when printed or scanned on certain types of equipment. For example, given a certain set of printing and/or scanning equipment, the rendering of the precisely desired amount of yellow is difficult to obtain; in such a case, the lack of accuracy in printing or detecting yellow could be compensated for by using a value of $\alpha$ which increases depending on the amount of yellow in the average color. In this way, the large difference in color-space among color patches (caused by the large $\alpha$) compensates for the lack of optical acuity in detecting yellow. For colors which are relatively easy for the scanner to discriminate, such as red, a smaller value of $\alpha$ will suffice, and a smaller a will be less conspicuous in a printed document.

While this heuristic and empirical approach to selecting a color space direction for $v_0$ is generally useful, there is a need to provide a more rigorous approach to determining the orientation of $v_0$ in color space, and the '521 application does not provide such a rigorous approach.

SUMMARY OF THE INVENTION

The present invention is motivated by the need to select a color that changes from a given input color, denoted as input color c, according to certain criteria or constraints. One criterion is that the changed color must fall in a color space along a vector that extends in a direction away from input color c in the color space. This vector is referred to herein as the "color space direction $\Delta w$", of input color c. Note that in this description, vectors will be represented as underlined bold lower case letters. Another criterion for selecting the changed color is that the color difference between input color c and the changed color is a color difference that must be simultaneously minimally perceptible to a human viewer and maximally detectable by a digital image capture device such as a scanner. The present invention is premised on the observation that color space direction $\Delta w$ could be any one of a number of color directions from input color c but that there is a unique color direction that optimally satisfies the perception and detection criteria.

The present invention is premised on the discovery of a way of mathematically modeling the problem of determining color space direction $\Delta w$ as an optimization problem. A model of human perceptual response and a model of the response of a digital image capture device (e.g., scanner) are inputs to the mathematical model and are used to measure responses to color changes. The mathematical model recognizes that an input color positioned in a color space can be varied along any one of a number of directions (i.e., vectors) but that there is an optimal color direction vector in color space along which changes in the input color simultaneously minimize color response by a human viewer and maximize color response by a scanner.

A quantitative and physically-based model of human perception is an input to the technique and measures a quantitative perceptual difference between an input color and a changed color, toward the goal of producing a color direction in color space along which a change away from an input color is minimally perceptible to a human viewer. Similarly, a model of the color responses of a scanner measures a quantitative response difference between an input color and the same changed color, toward the goal of simultaneously producing the color direction along which the color change away from the input color is most detectable by the scanner.

The technique of the present invention has a variety of uses. The technology described in the '521 application provides an efficient and innovative way of encoding information in color images, and the present invention may be used in conjunction with that technology to provide a rigorous method for determining an appropriate color space vector $v_0$ for a given an input color. It should be noted, however, that the present invention is not limited to such a use. For example, there may be a need to change colors in a color image so that they are more detectable by a scanner but at the same time the color change must be as imperceptible as possible so as not to alter the quality of the image to a human viewer.

Therefore, in accordance with one aspect of the present invention, a method is provided for operating a processor-controlled machine to determine, for a given input color, an optimal direction in color space away from the given input color that satisfies a set of constraints. The machine includes a signal source for receiving data; memory for storing data; and a processor connected for accessing and executing instruction data stored in the memory for operating the machine; the processor is further connected for receiving data from the signal source; and connected for storing data in the memory. The method comprises obtaining an input color defined in coordinates of a multi-dimensional color space, and specifying an objective function that balances measurements of a human perceptual response and a digital image capture device response to a color change. The color change is defined by a color space direction away from the input color. The objective function simultaneously minimizes the human perceptual response measurement and maximizes the digital image capture device response measurement to the color change. The method then determines an optimal color space direction in the multi-dimensional color space away from the input color using the objective function.

The novel features that are considered characteristic of the present invention are particularly and specifically set forth in the appended claims. The invention itself, however, both as to its organization and method of operation, together with its advantages, will best be understood from the following description of an illustrated embodiment when read in connection with the accompanying drawings. In the Figures, the same numbers have been used to denote the same component parts or steps. The description of the invention includes certain terminology that is specifically defined for describing the embodiment of the claimed invention illustrated in the accompanying drawings. These defined terms have the meanings indicated throughout this specification and in the claims, rather than any meanings that may occur in other sources, such as, for example, documents, if any, that are incorporated by reference herein elsewhere in this description.

DETAILED DESCRIPTION OF THE INVENTION

1. General Overview and Features

As a preliminary matter, the following mathematical notation is used in this description: A vector is represented as an underlined bold lower case letter. A scalar is represented as an italic lower case letter. A matrix is represented as a bold capital letter.

Figure 1:
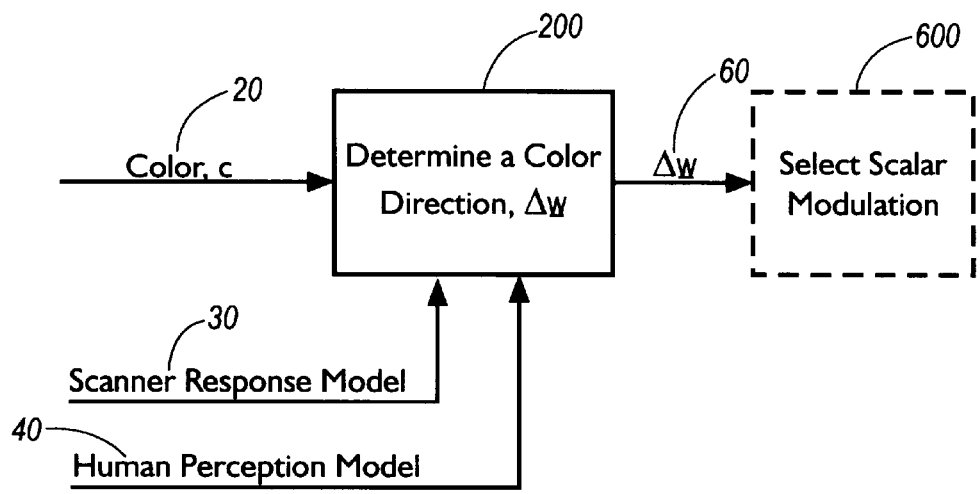
FIG. 1 is a block diagram schematically illustrating the input and output data structures of the present invention.

The technique of the present invention implements a mathematical model for determining an optimal direction of a vector $\Delta w$ in a color space subject to a given set of constraints. FIG. 1 shows the technique as operation 200 and generally illustrates the input and output data structures operation 200 requires. An input color 20, also denoted as color c, is the color for which color space direction $\Delta w$ is desired. Scanner response model 30 and human perception model 40 provide measurement mechanisms for quantitatively measuring a color difference between color c and the color defined at the color space vector Δw away from color c; the color difference is tested against the constraints of the mathematical model. The technique produces optimal color space direction Δw, denoted as vector 60 in FIG. 1.

Figure 2:
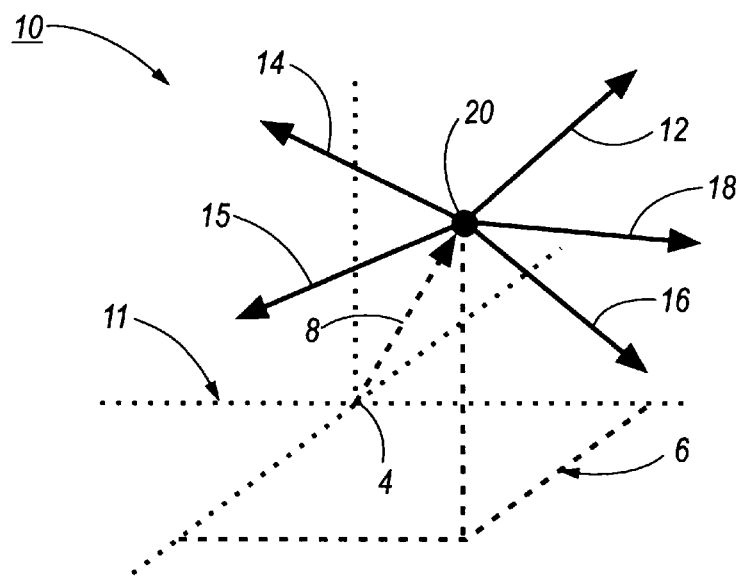
FIG. 2 schematically illustrates a perspective view of an arbitrary three-dimensional color space showing a color positioned therein and showing candidate vector directions in color space along which the color may be changed.
Figure 3:
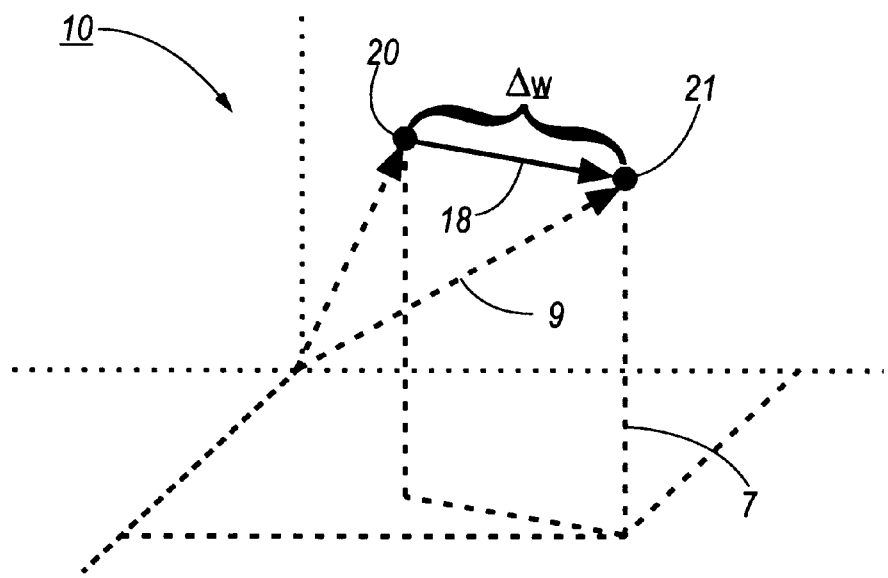
FIG. 3 schematically illustrates the color space of FIG. 2 showing a selected candidate color space direction, $\Delta w$.

FIGS. 2 and 3 schematically illustrate the problem that the present invention solves. Three-dimensional arbitrary color space 10 in FIG. 2 is defined by bold dotted line axes 11 and has its origin at point 4. Input color 20 is positioned in color space 10 as shown; dashed line vector 8 from color space origin 4 and dashed lines 6 simply provide clarification as to the location of input color 20 in the perspective diagram of FIG. 2. Colors that differ from color 20 in color space 10 could be positioned along any one of a number of vectors 12, 14, 15, 16, and 18. The problem is to find a color space direction from which a color may be selected that has a measurable color difference that satisfies the problem constraints; as noted earlier, these constraints are that a vector in color space in a color direction away from color c is an optimal color space direction Δw when color space direction Δw simultaneously minimizes color response by a human viewer and maximizes color response by a scanner to the color difference between color c and color space direction Δw. FIG. 3 also shows color space 10 but with only color space vector 18. Second color 21 is also shown positioned in color space 10, along vector 18. (As before, dashed line vector 9 and dashed lines 17 simply provide clarification as to the location of color 21 in the perspective diagram.) Color space direction 18 is the optimal color space direction when the measured, quantitative color difference between colors 20 and 21 simultaneously minimizes color response by a human viewer and maximizes color response by a scanner. The technique of the present invention, and operation 200 of FIG. 1, determines Δw.

2. General Operation of Vector Determination Operation 200

Operation 200 implements a mathematical model for determining an optimal direction of a vector Δw in a color space subject to the constraints that the measured, quantitative color difference between two colors positioned on Δw simultaneously minimizes color response by a human viewer and maximizes color response by a digital image capture device such as a scanner. As a way of establishing a shorthand reference to the functionality of operation 200, operation 200 will be herafter referred to as "vector determination operation 200", and it will be understood to refer to the functionality as just described.

Figure 4:
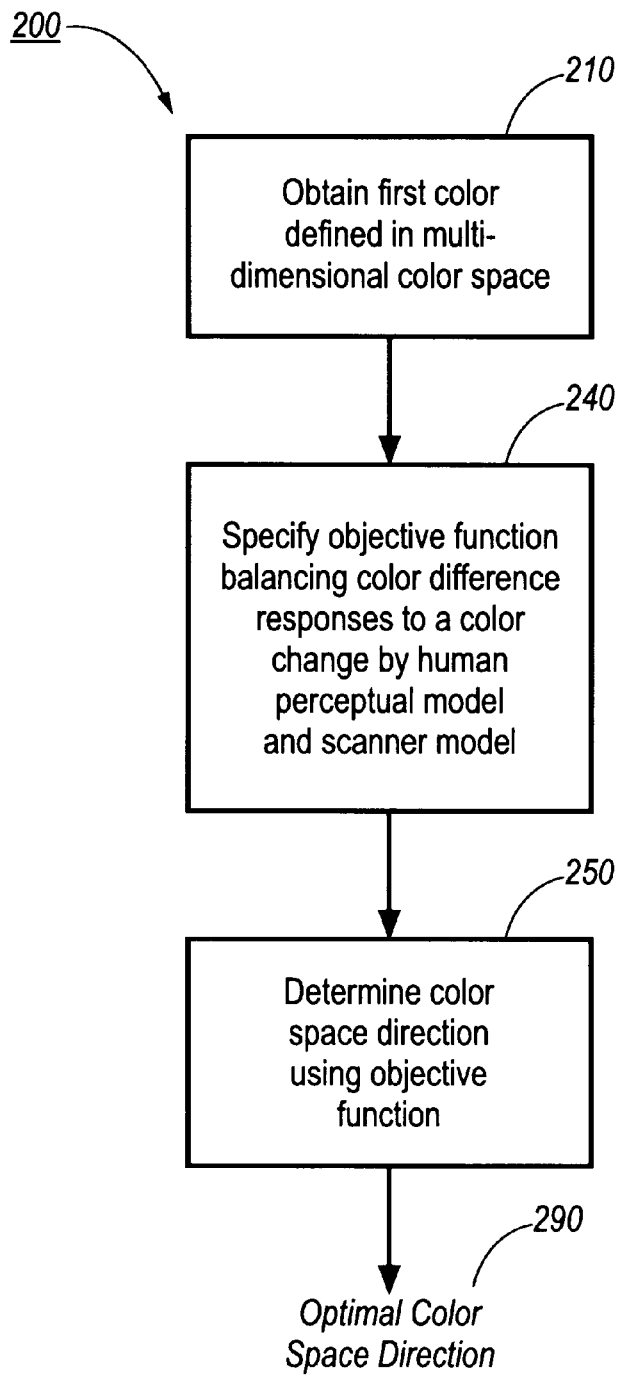
FIG. 4 is a flowchart illustrating the general operation of the color direction determination technique, according to an illustrated embodiment of the invention.

FIG. 4 shows the general operation of vector determination operation 200. Input color c is obtained in box 210; color c is defined as coordinates in a multi-dimensional color space.

A model of human perception is used to compute a perceptual difference measurement of the color change generated by Δw away from the input color. The perceptual difference measurement measures a quantitative physical response of the human vision system to the difference in color generated by Δw away from the input color. A model of signal responses of a digital image capture device such as a scanner is used to compute a device response difference measurement generated by Δw away from the input color. The device response difference measurement measures a quantitative physical response of the digital image capture device to the difference generated by Δw away from the input color.

Operationally, the process of determining the optimal color direction is efficiently carried out by mathematically modeling the human and scanner responses to color changes in the input color signal in a multi-dimensional color space, and characterizing the task of finding the optimal color space direction that satisfies the constraints as an optimization problem. An illustrated embodiment of this approach is described next, with reference to the flowchart of FIG. 5. In this description, several preliminary matters are presented first. A description of the data representation of input color c is provided. Then, the models of human perception and scanner response are discussed, followed by a description of the multi-dimensional color space that is defined and in which the illustrated embodiment of the invention operates. Note that the illustrated embodiment uses discrete linear models to represent illuminants, surface reflectances, and sensor responses.

3. Input Color Data Representation

For purposes of the illustrated embodiment, an input color, c, for which the optimal color space direction is to be determined, is assumed to be printed on a marking medium such as paper by a marking device such as a printer, and is further assumed to be viewed under a fixed, standard illuminant. The spectral power distribution of an illuminant at N sample wavelengths is represented by the vector, $e \in R^N$. Characterization and representation of input color, c, in this model has two components: its spectral power distribution of light reflected from the surface of the marking medium under the illuminant at the location where input color, c, is printed, and the human response to that distribution. In the absence or florescence and phosforescence, incident light at a given wavelength is emitted as light at the same wavelength. Under these conditions, the surface reflectance function of light distribution is designated as vector σ, the illuminant is designated as the diagonal matrix E=diag(e), and the spectral power distribution of the light reflected from the surface is given by their product Eσ, which is also referred to herein as the incident power density spectrum of input color, c.

The human response to spectral power distribution Eσ is defined as follows. The response of a sensor (i.e., a cone cell) in the human eye at each wavelength of incident light can be represented by a vector, x. The scalar response, r, of the human sensor to light reflected from a surface is given by $r = x^t E\sigma$. In the case of the human eye, there are three different spectral sensors (to long, medium and short wavelengths) which are represented by a matrix $X=[x_1\ x_2\ x_3]$. The total human response to the spectral power distribution of input color, c, is thus given by $r=X^t E\sigma$. Under a fixed illuminant, it is convenient to define a response matrix $T=X^t E$. Then the total human response to the spectral power distribution of input color, c, is given by $r=T\sigma$ which directly relates surface properties (captured in σ) to sensor responses.

Figure 5:
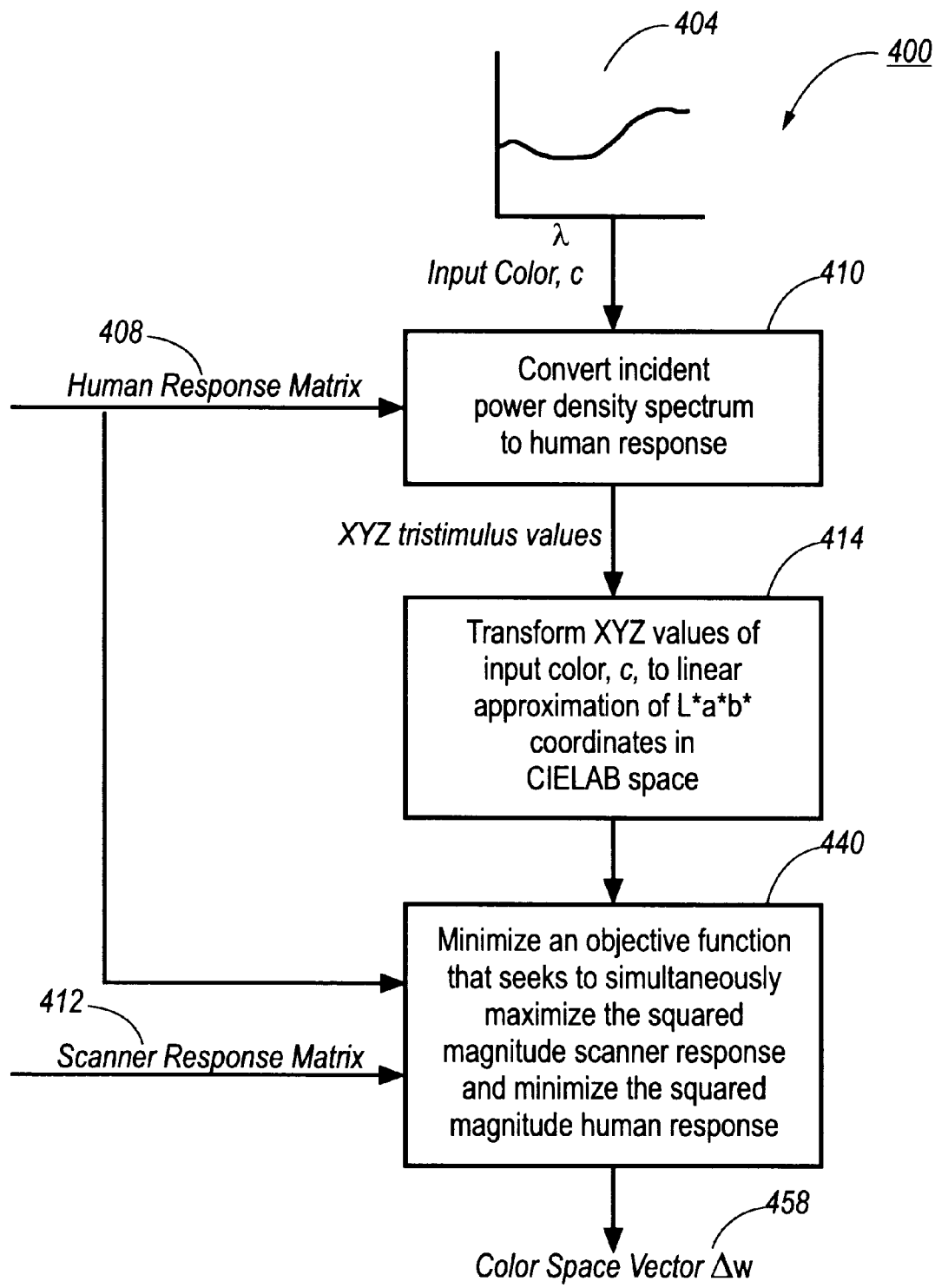
FIG. 5 is a flowchart illustrating the general operation of an illustrated embodiment of the present invention.

With reference now to FIG. 5, this physical model of input color, c, can be accomplished practically in the context of the illustrated embodiment by measuring the incident power density spectrum, σ, of a color patch of input color, c, printed on white paper using a spectrophotometer or other suitable instrument. This spectrum 404 is then multiplied, in box 410, by the human response matrix 408, designated as $T_h$, the development of which is described in detail below, to produce CIE XYZ tristimulus values as the data representation of input color, c, with which subsequent computations are made. This computation is captured in Equation (3) below.

Variations in printer characteristics could influence the accuracy of the XYZ tristimulus values that are computed as a result of this process. However, for purposes of the illustrated embodiment, it is assumed that the printer which prints input color, c, from which the spectrum is measured is calibrated such that when the printer, in response to an input XYZ value of a color, renders a spectrum by a combination of marking materials (e.g., inks, toners, etc.), the spectrum under standard illumination yields that same XYZ response when viewed by a human.

Input color, c, could also be measured from a small color image region of a color image as opposed to a constant color patch. In this case, the measurement and subsequent conversion to XYZ values results in specifying the average color of this image region.

4. The Human Perception Model a. The Human Response Transfer Matrix.

Psychophysical color matching experiments have led to an empirical model of the human visual system's spectral sensitivity. At the lowest levels of the human visual system, three different types of cone cells (long, medium and short, designated as LMS) have responses directly related to the rate of photon absorption. The human tristimulus functions $\bar{x}(\lambda)$, $\bar{y}(\lambda)$ and $\bar{z}(\lambda)$ characterize as a function of wavelength a linear transformation of the responsitivities of the three cone cells responsible for human color vision. That is, $$\begin{bmatrix} L \\ M \\ S \end{bmatrix} = A \begin{bmatrix} X \\ Y \\ Z \end{bmatrix} \quad (1)$$

where matrix A is a known linear transformation of the $[X\ Y\ Z]^t$ tristimulus values to the cone responsivities $[L\ M\ S]^t$. The $[X\ Y\ Z]^t$ tristimulus values are often used in place of the cone responsivities $[L\ M\ S]^t$ because they have some convenient properties, and they are used in the model of human perception of the illustrated embodiment herein.

The cone responsivities to the incident power density spectrum E$\sigma$ are related to cone response by $$r = \begin{bmatrix} X \\ Y \\ Z \end{bmatrix} = X_h^t E \underline{\sigma} \quad (2)$$

where the rows of $X_h^t$ are sampled tristimulus functions. The human response transfer matrix is defined to be $$T_h = X_h^t E \quad (3)$$

which combines the illuminant matrix, E, with the sampled tristimulus functions that represent the cone responses. While combining a standard illuminant with cone responses is not exactly precise for humans because the illumination varies in spectral composition, a fixed, standard illuminant is assumed for simplicity in the model. Substituting Equation (3) in Equation (2) gives $$\begin{bmatrix} X \\ Y \\ Z \end{bmatrix} = T_h \underline{\sigma} \quad (4)$$

which yields the XYZ tristimulus values for a given input power spectrum, $\sigma$.

b. A linear approximation of human response to spectral differences.

Because a critical component in determining an optimal color space according to the present invention is being able to measure human response to color differences (and to be able to minimize that response), a model is needed that accurately measures such human response differences. Input color, c, must be represented in terms of this perceptual model and a perceptual difference measurement must be made between input color, c, and a second color which collectively define a color space direction.

The human tristimulus functions do not adequately model human sensitivity to spectral differences. However, several international standard color models have been proposed that attempt to provide mechanisms for qualitatively measuring human response to color changes with varying degrees of success. One such model is the CIE (Commission Internationale de l'Eclairage) standard model of human color perception known as CIELAB. The illustrated embodiment of the present invention makes use of the CIELAB model. In the CIELAB model, a color represented as XYZ tristimulus values is converted by a non-linear transformation to a three-dimensional human perceptual color space parameterized by L*, a* and b*. In CIELAB color space, a Euclidean distance in the color space between two colors represents as closely as possible a quantitative measurement of the actual perceptual difference observed between the colors by a human observer under normal illumination levels. The transformation from XYZ tristimulus values to L*a*b* coordinates is well-known in the field of color science, but is provided here for convenience:

$$L^* = 116 \left(\frac{Y}{Y_0}\right)^{\frac{1}{3}} - 16 \quad (5)$$

$$a^* = 500\left[\left(\frac{X}{X_0}\right)^{\frac{1}{3}} - \left(\frac{Y}{Y_0}\right)^{\frac{1}{3}}\right] \quad (6)$$

$$b^* = 200\left[\left(\frac{Y}{Y_0}\right)^{\frac{1}{3}} - \left(\frac{Z}{Z_0}\right)^{\frac{1}{3}}\right] \quad (7)$$

where $X_0$, $Y_0$, and $Z_0$ are constants defining what is called the "white point."

Since the mathematical model of the illustrated embodiment seeks a linear solution to the problem of finding an optimal color space direction, it is necessary to compute a linear approximation of the transformation from XYZ tristimulus values to L*a*b* coordinates. A first order approximation of the dependence of L*, a* and b* on X, Y and Z is given by $$\begin{bmatrix} L^* \\ a^* \\ b^* \end{bmatrix}(X + \Delta X, Y + \Delta Y, Z + \Delta Z) \approx \begin{bmatrix} L^* \\ a^* \\ b^* \end{bmatrix}(X, Y, Z) + \quad (8)$$

$$\begin{bmatrix} \frac{\partial L^*}{\partial X} & \frac{\partial L^*}{\partial Y} & \frac{\partial L^*}{\partial Z} \\ \frac{\partial a^*}{\partial X} & \frac{\partial a^*}{\partial Y} & \frac{\partial a^*}{\partial Z} \\ \frac{\partial b^*}{\partial X} & \frac{\partial b^*}{\partial Y} & \frac{\partial b^*}{\partial Z} \end{bmatrix} \begin{bmatrix} \Delta X \\ \Delta Y \\ \Delta Z \end{bmatrix}$$

where the Jacobian J is given by $$J = \begin{bmatrix} \frac{\partial L^*}{\partial X} & \frac{\partial L^*}{\partial Y} & \frac{\partial L^*}{\partial Z} \\ \frac{\partial a^*}{\partial X} & \frac{\partial a^*}{\partial Y} & \frac{\partial a^*}{\partial Z} \\ \frac{\partial b^*}{\partial X} & \frac{\partial b^*}{\partial Y} & \frac{\partial b^*}{\partial Z} \end{bmatrix} \qquad (9)$$

$$= \begin{bmatrix} 0 & \frac{116}{3Y_0}\left(\frac{Y}{Y_0}\right)^{-\frac{2}{3}} & 0 \\ \frac{500}{3X_0}\left(\frac{X}{X_0}\right)^{-\frac{2}{3}} & -\frac{500}{3Y_0}\left(\frac{Y}{Y_0}\right)^{-\frac{2}{3}} & 0 \\ 0 & \frac{200}{3Y_0}\left(\frac{Y}{Y_0}\right)^{-\frac{2}{3}} & -\frac{200}{3Z_0}\left(\frac{Z}{Z_0}\right)^{-\frac{2}{3}} \end{bmatrix}$$

With reference again to FIG. 4, a preparatory step in the illustrated embodiment of vector determination operation 400 is to transform the XYZ representation of input color, c, to CIELAB space, in box 414, using the first order approximation provided by Equations (8) and (9). In particular, matrix J is computed once for a given input color, c; matrix J represents the linear approximation of the transformation of the XYZ representation of input color, c, to L*a*b* coordinates in CIELAB space where color difference measurements can be made. A color difference measurement measures the perceptibility of the difference between input color, c, and a second color. Since this color difference is first expressed as a change in the input power spectrum, σ it must be converted to XYZ tristimulus values and then must also be converted to L*a*b* coordinates, using J as follows, $$\begin{bmatrix} \Delta L^* \\ \Delta a^* \\ \Delta b^* \end{bmatrix} = J \begin{bmatrix} \Delta X \\ \Delta Y \\ \Delta Z \end{bmatrix} = JT_h \Delta \underline{\sigma} \qquad (10)$$

where Δσ is a small change in the surface reflectance function.

The perceptibility of a color difference is estimated by the CIELAB color difference formula which gives the quantity $$\Delta E = \sqrt{(\Delta L^*)^2 + (\Delta a^*)^2 + (\Delta b^*)^2} \qquad (11)$$

Combining Equations (10) and (11), the color difference measurement ΔE can be expressed in terms of matrix J and the human response transfer matrix, $T_h$ as follows, $$(\Delta E)^2 = \begin{bmatrix} \Delta L^* & \Delta a^* & \Delta b^* \end{bmatrix} \begin{bmatrix} \Delta L^* \\ \Delta a^* \\ \Delta b^* \end{bmatrix} = (\Delta \underline{\sigma})^t (JT_h)^t (JT_h) \Delta \underline{\sigma}. \qquad (12)$$

While CIELAB is used as the human perception model in the illustrated embodiment, other models of human color perception may be suitable for use with the present invention. Such a model must provide the functional ability to measure a color appearance difference between two colors that represents the perceptual difference that the human eye would perceive between the two colors, and to express the measured difference quantitatively in a manner that accurately corresponds to actual human color visual responses.

The human tristimulus functions discussed above characterize human color response with respect to large uniform color patches. In principal, these functions could be extended to account for color sensitivities as a function of spatial frequency as well. Studies have shown that as spatial frequency goes up, the human has less ability to see color differences; thus, a model that took spatial frequency into account would most likely be able to provide optimal color space directions where the color difference between the input and second colors is greater than the present model allows. Larger color differences, in turn, facilitate detection of the differences by the scanner.

5. The Scanner Response Model

As already noted, one of the constraints of the optimization problem is that the scanner response to a color difference between the input and second colors must be maximized at the same time that the human response to the color difference is minimized. This requires that a model of the scanner response be constructed. A typical color scanner has a scanning linear array of CCD sensors which scans a page and converts it to a two-dimensional pixel array. Using color filters and either multiple CCD arrays or multiple scan passes, three color images are produced capturing the sensor responses in three different channels, red, green and blue (R,G,B). In a manner analogous to the human response transfer matrix, the response of each of the three color channels of the scanner can be characterized by a spectral response vector: $x_R$, $x_G$ and $x_B$. The linear 3×N scanner transfer matrix is defined to be $$T_s = [x_R \; x_G \; x_B]^t E \qquad (13)$$

As with the human response transfer matrix, the rows of $T_s$ represent the combination of the spectral sensitivities of the scanner channels with the scanner illumination; because the illuminant is fixed and known a priori, this is a reasonable approach to representing the scanner response. The total response, r, is given by $$\underline{r} = \begin{bmatrix} R \\ G \\ B \end{bmatrix} = T_s \underline{\sigma} \qquad (14)$$

In order to build a model of the scanner, the scanner transform matrix, $T_s$, must be estimated for a particular device, given surface reflectances σ and scanner responses r. One approach is to compute a linear least-squares fit between a set of measured spectral reflectances of a set of surface color patches and the set of corresponding scanner responses. There has been considerable research in this area, and techniques for measuring the scanner transfer matrix are available in publications in the field. For example, see J. Farrell and B. Wandell, "Scanner linearity", *Journal of Electronic Imaging*, Vol.2(3), July, 1993.

6. Preliminary Definition of the Objective Function

The models set forth so far are the necessary preliminary foundation to defining the objective function for the optimization problem of determining an optimal color space direction. An optimal color space vector includes input color, c, and spectral variations of input color, c, that the scanner can reliably detect, yet which are minimally perceptible to the human observer. Some conclusions can now be drawn with respect to the objective function which expresses the constraints on the optimal color sapce vector.

The set of all possible surface reflectance functions σ in this discrete approximation is a subset of $R^N$. All possible surface reflectance functions visible to a human are given by the linear combinations of the rows of the human response transfer matrix, $T_h$:

$$\sigma = T_h^t w \qquad (15)$$

where w is a set of weights on the vectors spanning the space of visible surface reflectance spectra. Similarly, the set of surface reflectance spectra visible to the scanner lie in the row space of of the scanner response transfer matrix, $T_s$, with $$\sigma = T_s^t w \tag{16}$$

The response, r, to a spectral variation, $\Delta w$ is given by $$r = T_s T_s^t \Delta w \tag{17}$$

The response that is maximally detectable by a scanner is given by the direction of $\Delta w$ that maximizes the squared magnitude of the response, $$(\Delta r)^t (\Delta r) = \Delta w^t T_s T_s^t T_s T_s^t \Delta w \tag{18}$$

It can be seen that the variation $\Delta w$ to which the scanner is most responsive is given by the eigenvector of the 3×3 matrix $T_s T_s^t$ with the largest eignvalue.

With respect to human perception, Equation (11) states the CIELAB $\Delta E$ formula for quantifying the perceptibility of a human to a spectral variation. Following a similar line of reasoning to that of the scanner response, Equation (12) can be expressed in terms of $\Delta w$ as $$(\Delta E)^2 = [\Delta L^* \ \Delta a^* \ \Delta b^*] \begin{bmatrix} \Delta L^* \\ \Delta a^* \\ \Delta b^* \end{bmatrix} \tag{19}$$

$$= (\Delta w)^t (JT_h T_h^t)^t (JT_h T_h^t) \Delta w.$$

Again, it can be seen that the variation $\Delta w$ that is least perceptible to a human is given by the eigenvector of the 3×3 matrix $(JT_h T_h^t)^t (JT_h T_h^t)$ with the smallest eigenvalue.

7. Selecting the Basis Vectors of a Multi-dimensional Color Space

The approach the illustrated embodiment takes to relating the human and scanner responses is to use the linear approximation to the human perceptual response developed in Section 4 together with the linear model of scanner responses. In order to do this, a basis common to both the human transfer matrix and the scanner transfer matrix must be found for representing spectral variations. The description of the selection of a set of basis vectors that follows is based on work developed by Marimont and Wandell in "Linear models of surface and illuminant spectra", *Journal of the Optical Society of America*, November 1992, 9:11, pp. 1905–1913. They observe that an optimal spectral basis chosen to simultaneously minimize the approximation error for both the human and scanner responses has better characteristics than a basis simply chosen to optimally represent the surface reflectance functions.

The analysis for selecting a set of basis vectors proceeds as follows. Let $B_k$ be an N×k matrix of k column vectors representing basis vectors for the set of surface reflectance functions, $S=[\sigma_1 \ \sigma_2 \ \dots]$, where $\sigma_i = B_n w_i$ for some set of weights, $w_i$, when $\sigma_i \in R^N$. Consider approximating a surface reflectance function, $\sigma_i$, as $\sigma_i \approx B_k w_i$ in terms of the basis $B_k$ for k<N. The coefficient vector $w_i$ is given by a least squares best fit: $w_i = B_k^t \sigma_i$, where $B_k^t$ is the pseudoinverse of $B_k$. Thus, an approach to finding $B_k$ is to find the basis $B_k$ which minimizes the error in $X=[X \ Y \ Z]^t$ and $R=[R \ G \ B]^t$ in the expression $$\begin{bmatrix} R \\ X \end{bmatrix} = \begin{bmatrix} T_s \\ T_h \end{bmatrix} B_k W = \begin{bmatrix} T_s \\ T_h \end{bmatrix} B_k B_k^+ S \tag{20}$$

where $R=[R_1 \ R_2 \ \dots]$, $X=[X_1 \ X_2 \ \dots]$, and $W=[w_1 \ w_2 \ \dots]$.

8. Determining the Optimal Color Space Direction by Minimizing an Objective Function Definition of the human and scanner transfer matrices and the selection of the basis vectors as described above do not depend on the value of any input color, c, and so are all accomplished prior to determining an optimal color space vector; the human and scanner transfer matrices and the basis vectors are all inputs to the optimization process.

One way of many to construct the objective function is to use the concepts and mathematical models described above, as follows. Consider a basis set B as chosen above. The local change in scanner response to a spectral change, denoted as $\Delta \sigma = B \Delta w$, is expressed as $\Delta R = T_s B \Delta w$. The local change in human response to a spectral change is expressed as $\Delta L = JT_h B \Delta w$. The constraints of the objective function state that $\Delta L$ should be made as small as possible while simultaneously making $\Delta R$ as large as possible. An objective function can be constructed from Equations (18) and (19), expressed in terms of the local response changes $\Delta L$ and $\Delta R$ and the basis vectors B; the optimal local spectral variation $\Delta w$ can be found by minimizing the objective function $$\frac{(\Delta w)^t (JT_h B)^t (JT_h B)(\Delta w)}{(\Delta w)^t (T_s B)^t (T_s B)(\Delta w)} \tag{21}$$

which seeks to simultaneously maximize the squared magnitude scanner response and minimize the squared magnitude human response to local spectral variation. The notation can be simplified as follows: Let $U=(JT_h B)^t (JT_h B)$ and $V=(T_s B)^t (T_s B)$, the objective function becomes $$\frac{(\Delta w)^t U (\Delta w)}{(\Delta w)^t V (\Delta w)}. \tag{22}$$

Taking the derivative of Equation (22) with respect to the components of $\Delta w$ and setting it to equal zero yields $$\frac{U(\Delta w)(\Delta w^t V \Delta w) - V(\Delta w)(\Delta w^t U \Delta w)}{(\Delta w^t V \Delta w)^2} = 0 \tag{23}$$

Assuming $\Delta w$ is always finite in length, the denominator of Equation 23 can be ignored. Further assuming that $V^{-1}$ exists, the rearranged terms of Equation 23 produces $$V^{-1} U \Delta w = \Delta w \frac{(\Delta w^t U \Delta w)}{(\Delta w^t V \Delta w)} \tag{24}$$

Equation (24) reveals that $\Delta w$ must be an eigenvector of the matrix $V^{-1}$ with eigenvalue $$\frac{(\Delta w^t U \Delta w)}{(\Delta w^t V \Delta w)}$$

which is the expression that is being minimized. This expression takes on a minimum when $\Delta w$ is in the direction of the eigenvector of $$V^{-1} U = [(T_s B)^t (T_s B)]^{-1} [(JT_h B)^t (JT_h B)] \tag{25}$$

with the smallest eigenvalue. Note that if a second color direction were desired, the eignevector associated with the second smallest eigenvalue could be used for this direction.

9. Selecting Color Modulations

Figure 6:
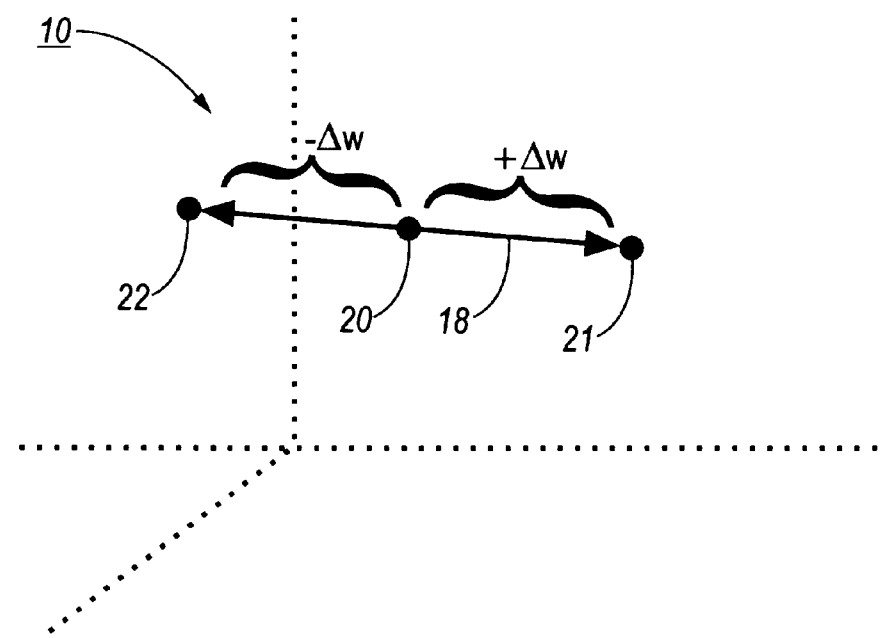

With reference again to FIG. 1, note that if the color space direction produced by vector determination operation 200 is to be used in the technique described in the '521 application, then color space direction Δw is input to operation 600 for selecting the scalar, α, that is used to modulate a given input color to produce two colors for imperceptibly embedding encoded information in a color image. Operation 600 processing is strictly optional with respect to the present invention and so is shown in FIG. 1 as having a dashed outline. FIG. 6 illustrates selection of color modulations using the optimal color space direction determined according to the present invention.

While the invention has been described in conjunction with one or more specific embodiments, this description is not intended to limit the invention in any way. Accordingly, the invention as described herein is intended to embrace all modifications and variations that are apparent to those skilled in the art and that fall within the scope of the appended claims.

What is claimed is:

1. A method for operating a processor-controlled machine to determine, for a given input color, an optimal direction in color space that includes the given input color and that satisfies a set of constraints; the machine including an output device, a processor, and a memory device for storing data; the data stored in the memory device including instruction data the processor executes to operate the machine; the processor being connected to the memory device for accessing and executing the instruction data stored therein; the method comprising:

obtaining an input color defined in coordinates of a multi-dimensional color space;

specifying an objective function that balances measurements of a human perceptual response and a digital image capture device response to a color change; the color change being defined by a color space direction away from the input color; the objective function simultaneously minimizing the human perceptual response measurement and maximizing the digital image capture device response measurement to the color change;

determining an output color defined as an optimal color space direction in the multi-dimensional color space away from the input color using the objective function;

encoding data as a pattern comprising one or more picture elements in an output color and one or more picture elements in the input color; and outputting, on the output device, the encoded data such that the pattern is minimally visually perceptible to humans while, at the same time is maximally detectable by the digital image capture device.

2. A method for operating a processor-controlled machine to determine, for a given input color, an optimal direction in color space that includes the given input color and that satisfies a set of constraints; the machine including an output device, a processor, and a memory device for storing data; the data stored in the memory device including instruction data the processor executes to operate the machine, the processor being connected to the memory device for accessing and executing the instruction data stored therein, the method comprising:

obtaining an input color defined in coordinates of a multi-dimensional color space;

specifying an objective function that balances measurements of a human perceptual response and a digital image capture device response to a color change, the color change being defined by a color space direction away from the input color, the objective function simultaneously minimizing the human perceptual response measurement and maximizing the digital image capture device response measurement to the color change;

determining a range of output colors defined as optimal color space directions in the multi-dimensional color space away from the input color using the objective function;

encoding data as a pattern comprising a plurality of picture elements in one or more output colors of the range of output colors; and outputting, on the output device, the encoded data such that the pattern is generally visually non-perceptible to humans while, at the same time is detectable by the digital image capture device.

3. The method of claim 2, wherein determining a range of output colors comprises determining an optimal output color, such that human visual discriminability is minimized while, at the same time, machine discriminability is maximized.

4. The method of claim 2, wherein determining a range of output colors comprises determining a minimally sufficient output color which is minimally visually non-discriminable to humans while, at the same time, is minimally machine discriminable.

5. The method of claim 2, wherein the output color is determined by:

representing the input color as a direction in a multi-dimensional color space;

determining a human visual response to the input color;

determining a machine response to the input color;

determining an objective function by balancing the human visual response and the machine response; and determining an output color which is a direction in the multi-dimensional color space away from the direction of the input color using the objective function.

6. The method of claim 2, wherein:

determining an output color comprises determining two output colors, both of which are different than the input color, which, when output as adjoining picture elements, are imperceptible to humans as being different colors, but which are discriminable as being different colors by machine; and wherein rendering the image to include the encoded data among the input color in the selected portion of the image comprises replacing at least some picture elements of the selected portion of the image with picture elements of the two output colors.

7. The method of claim 6, wherein the two output colors are selected such that when they are output as adjoining picture elements, they are imperceptible to humans as being different from the input color.

* * * * *